3,387,961
METHOD OF REDUCING REBOIL IN
MOLTEN GLASS
Walter M. Buehl and James H. Cowan, Jr., Corning, N.Y., assignors to Corning Glass Works, Corning, N.Y., a corporation of New York
No Drawing. Filed Jan. 25, 1965, Ser. No. 427,934
10 Claims. (Cl. 65—32)

ABSTRACT OF THE DISCLOSURE

A method of eliminating the formation of gaseous bubbles in a glass melt caused by the development of a galvanic cell in the molten glass which previously appeared plain.

This invention relates to improving the quality of glass and in particular to a method of preventing the formation in a glass melt of gaseous bubbles resulting from electrochemical reactions.

In the making of glass, the raw materials are heated until the fluxes melt and dissolve the sand and the other refractory ingredients. During these reactions gases, such as carbon dioxide and water, are given off together with entrapped air to produce numerous bubbles giving the melted glass an appearance of a foamy mass. These bubbles are eliminated in a continuous glass melting tank at the high temperatures of the melting end. When solution of the sand and elimination of the bubbles has been completed, the glass is cooled until its viscosity reaches a level at which it can be molded. The glass is first cooled in the refining portion of the tank which is generally at a temperature of 100–200° C. lower than the melting portion.

Sometimes there is a sudden reappearance of bubbles in the molten glass after it has previously appeared plain which is known as "reboil." This has been found to occur when a portion of the refining end of the tank is lined with platinum as illustrated by the continuous glass furnace used to make optical glass described by C. J. Phillips in "Glass, Its Industrial Applications," Reinhold (1960), 182. The existence of gas bubbles in the final glass substantially lowers its quality, and thus for optical uses large amounts of glass are lost due to reboil.

It is therefore an object of the present invention to make a glass of improved quality.

It is a further object of the present invention to provide a method for eliminating the formation of bubbles in the glass resulting from an electrochemical reaction.

A cause of reboil in molten glass can be the discharge of a galvanic cell involving the glass and the platinum lining of the melting tank. The platinum acts as the electrodes for the cell and as an electron conductor. At the anode or negative electrode oxidation occurs which may be illustrated by the equation:

$$O^= - 2e \rightarrow \tfrac{1}{2} O_2$$

The cathode or positive electrode is the site where reduction occurs. To complete the galvanic cell the molten glass acts as an electrolyte whereby the charged ions are capable of migrating to the electrodes.

One important type of galvanic cell that may arise during glass melting is caused by a temperature difference in the furnace giving rise to a thermally induced EMF. It is found that in some circumstances a temperature gradient existing in the glass melt produces a voltage which is sufficient to cause reboil. The evolution of gaseous bubbles of high oxygen content always occurs at the portion of the cell having the higher relative temperature regardless of the specific temperatures of the glass melt. Thus the anode is located at the hot portion of the melt and the cathode is found at the cold portion of the melt. In this system the electrons are being conducted by the platinum lining and travel from the anode to the cathode.

Another way in which a galvanic cell may aris in the glass melt is by the formation of a concentration cell. The EMF of the cell is dependent upon a concentration difference of some constituent in the glass between the two electrodes. This difference in concentration may arise from the fact that a portion of the constituents of the glass melt have volatized more rapidly at one part of the tank than at another. Also, a concentration difference may be intentionally created by placing a greater amount of a constituent in the vicinity of one of the electrodes. For example, in a concentration cell having a higher concentration of sodium oxide at one electrode than at the other, the electrode at which the greater concentration of sodium exists is generally the anode and the cathode is the site of lower sodium oxide concentration. The electrons will thus pass through the electron conductor from the electrode at the site of greater concentration of the sodium oxide to the electrode at the site of lower concentration.

In accordance with the present invention, we have discovered a method of eliminating the formation of gaseous bubbles in a glass melt caused by the development of a galvanic cell in the molten glass by covering the cathodic portion of the galvanic cell with a nonoxidizing atmosphere. We have found that when an inert nonoxidizing atmosphere is applied at the cathodic region of the galvanic cell, that is at the platinum-glass-atmosphere interface, the electrochemical reaction will cease and the formation of oxygen bubbles at a site remote from where the nonoxidizing atmosphere has been applied will terminate.

A possible theoretical explanation of the formation of bubbles is that the electromotive force of the thermally induced cell, platinum/glass $(T_1)$—glass $(T_2)$/platinum, wherein the temperature $T_1$ is greater than the temperature $T_2$ causes oxygen ions of the glass melt to become oxidized at the electrode of higher temperature, i.e., the anode. In order that the system remain in a state of electroneutrality, positive ions migrate to the electrode of lower temperature, i.e. the cathode, where an adsorption of electrons equivalent to the discharge by the oxygen ion occurs. However, on the basis of available experimental data, it is not possible to clearly define the nature of the reaction at the cathode. We have found, for example, that oxygen which is available in the region of the cathode is an indispensable and determining factor in the electrochemical reaction. The continued discharge of positive ions seems to be capable of taking place only through the subsequent reaction with an oxidizing atmosphere. This is clearly borne out by the fact that when the oxidizing atmosphere is removed, the reaction ceases and no oxygen bubbles are formed at the anode.

The process of the present invention requires that the glass composition be heated to a molten form to permit the passage of charged ions. The electrochemical effect appears to be related to the presence of monovalent cations, such as alkali metal ions, and to a lesser extent the presence of divalent cations, such as alkaline earth metal ions. Useful glass compositions and illustrative formulations as determined upon a weight percent on the oxide basis includes—

(a) Soda lime glass: Percent
   $SiO_2$ ---------------------------------- 72
   $Al_2O_3$ --------------------------------- 1
   $Na_2O$ ---------------------------------- 13
   $CaO$ ----------------------------------- 11
   $MgO$ ----------------------------------- 3

(b) Borosilicate glass:

| | Percent |
|---|---|
| $SiO_2$ | 80.5 |
| $B_2O_3$ | 13 |
| $Al_2O_3$ | 2 |
| $Na_2O$ | 4 |
| $K_2O$ | 0.5 |

(c) Aluminosilicate glass:

| | Percent |
|---|---|
| $SiO_2$ | 59 |
| $B_2O_3$ | 5 |
| $Al_2O_3$ | 20 |
| $Na_2O$ | 1 |
| CaO | 6 |
| MgO | 9 |

(d) Lead glass:

| | Percent |
|---|---|
| $SiO_2$ | 57 |
| $Al_2O_3$ | 1 |
| $Na_2O$ | 5 |
| $K_2O$ | 8 |
| PbO | 29 |

The range of proportion of the above glasses is further described by E. B. Shand in "Glass Engineering Handbook," second edition, McGraw-Hill (1958), 4.

It is necessary in order for the electrochemical reaction to occur that the vessel in which the molten glass is contained have election conducting properties. In the laboratory, platinum crucibles or foil served this purpose. However, on a commercial level in a continuous optical melting tank only a portion of the refiner end which has been lined with platinum permits electron conduction. Other conducting metals in addition to platinum which are useful include, silver, palladium and rhodium. The location of the electron conductor is another important factor to be considered. It must be located such that the electron conductor is exposed to the atmosphere at the cathode forming a platinum-glass-atmosphere interface. In the absence of an electron conductor no electrochemical reaction occurs.

The presence of a driving force is necessary to cause the electrochemical reaction. As has been discussed above, this driving force can can be either a thermally induced EMF which is usually the problem in commercial melting tanks or it may be the result of a difference in concentrations of one or more constituents in the glass composition between the anode and cathode. These constituents may generally be considered to be alkali metal oxide or alkaline earth metal oxide.

The novel process requires the absecne of an oxidizing atmosphere or stated positively the presence of a nonoxidizing atmosphere. Atmospheres which must be avoided are primarily air and oxygen and also include for example, chlorine gas and hydrogen chloride gas. While it would be possible to use a vacuum, generally it is desirable to use an inert nonoxidizing atmosphere such as, nitrogen, argon, and carbon dioxide.

One of the most important and critical features of the invention is the site of the nonoxidizing atmosphere. It is essential that the nonoxidizing atmosphere be located at the cathodic region of the galvanic cell, specifically, at the electron conductor-glass-atmosphere interface. When the glass is melted in a small laboratory crucible, it may very well be possible to place the entire crucible into a furnace and pass a nonoxidizing atmosphere over the entire crucible. This however, becomes very difficult and uneconomical when a galvanic cell is created in a large commercial continuous melting furnace. Our invention permits one to pinpoint the location at which the inert nonoxidizing atmosphere must be applied. Specifically, in the cell created by a thermally induced EMF in which the bubbles appear at the site of higher temperature, the inert nonoxidizing atmosphere must be applied at a point remote from the bubble formation which is at the site of lower tempreature or the cold side of the cell. In the electrochemical concentration cell in which the bubbles are formed at the site of higher concentration, the inert atmosphere must be applied at the point of lower concentration.

Our invention is further illustrated by the following examples:

EXAMPLE I

A borosilicate glass was prepared and melted to form the following composition determined on a weight percent on the oxide basis:

| Ingredient: | Wt. percent |
|---|---|
| Silica | 76.9 |
| Boric oxide | 16.2 |
| Aluminum oxide | 1.8 |
| Sodium oxide | 4.8 |
| Potassium oxide | 0.2 |

The glass was melted in a commercial optical tank furnace similar to the one described by C. J. Phillips, op. cit., p. 182. The fining was completed in a chamber lined with platinum and the illustrated system was modified such that the connection between the finer and the stir chamber was located below the glass line. A series of thermocouples were placed at various locations in the tank furnace. It was found that the finer bottom had a temperature of 1520° C. and the strip chamber had a temperature of 1400° C. The lowest temperature recorded was 1210° C. which was found in the orifice. This temperature gradient is sufficient for a thermally induced EMF to occur. The initial runs, performed in air, gave rise to reboil that resulted in losses of glass as high as 61% and an average of 23.3%.

Thereafter air was replaced by argon at various platinum-glass-atmosphere interfaces. Argon was introduced into the finer through a tube above the glass line at a rate of five cubic feet per hour, into the stir chamber through a drilled platinum tubing ring installed well down in the chamber at a rate of seven cubic feet per hour, and at the tip of the orifice tube above the shears at a rate of eleven cubic feet per hour. The results were a marked decrease in total glass loss until no glass was rejected because of reboil during the argon treatment.

Then the argon was removed and about three hours later bubbles were observed in the glass which began to increase in size and number until the tank was finally drained.

This experiment clearly indicates that in the presence of a nonoxidizing atmosphere, e.g. argon, reboil in glass caused by the formation of a galvanic cell can be completely eliminated.

EXAMPLE II

Various experiments were performed to demonstrate the necessity of a nonoxidizing atmosphere to prevent the formation of reboil bubbles caused by a concentration cell.

Into a three cubic centimeter new uncontaminated platinum crucibles were added two grams of the various glass compositions listed in the table below. The crucibles were placed in an electrically heated tube furnace containing a ceramic tube which was adapted to permit the introduction of the crucibles at one end and the passage of the various atmospheres set forth in the table below through the tube. In the first run the various glass compositions were heated in an air atmosphere. The temperature of the furnace was maintained at 1300° C. After observing the effect of air on the glass compositions the effect of other gases listed in the table below was studied. Initially the system was purged with the gas to be studied and the samples were then placed in the furnace while the gas was maintained at a flow rate of about one cubic foot per hour. The samples were kept in the furnace for a period of about 30 minutes.

It was found that reboil occurred in the oxidizing atmospheres, i.e. oxygen, air, and chlorine, and that no reboil occurred in the nonoxidizing atmospheres, i.e. argon and nitrogen. Gas analyses of the bubbles was performed using a mass spectrometer after dry crushing the glass sample under vacuum. The results are summarized in the table below.

TABLE.—EFFECT OF ATMOSPHERES ON REBOIL

| Glass Type | Atmosphere | Reboil | Gas Analysis |
|---|---|---|---|
| A. Soda lime | Oxygen | Present | Primarily $O_2$.* |
| | Air | do | Do. |
| | Chlorine | do | Do. |
| | Argon | None | |
| | Nitrogen | do | |
| B. Borosilicate | Oxygen | Present | Primarily $O_2$. |
| | Air | do | Do. |
| | Chlorine | do | Do. |
| | Argon | None | |
| | Nitrogen | do | |
| C. Lead glass | Oxygen | Present | Primarily $O_2$. |
| | Air | do | Do. |
| | Chlorine | do | Do. |
| | Argon | Slight | |
| D. Aluminosilicate | Oxygen | Present | Primarily $O_2$. |
| | Air | do | Do. |
| | Chlorine | do | Do. |
| | Argon | None | |
| | Nitrogen | do | |

*A few percent of other gases is always present since gases dissolved in the glass will diffuse into gas bubbles, usually the oxygen is above 90%.

EXAMPLE III

To show that differences in concentration between the surface of the glass and the interior of the glass can cause the formation of a galvanic cell, a series of experiments were performed in which the concentrations of sodium oxide in portions of the glass were intentionally varied. A concentration cell was produced by placing a low alkali glass on the surface of a high alkali glass as follows: 5 grams of glass composition (A) containing on an oxide basis 20% sodium oxide, 5% boric oxide and 75% silica was melted in a crucible and cooled; then 5 grams of glass composition (B) containing on an oxide basis 5% sodium oxide, 20% boric oxide, and 75% silica was placed above the first glass and melted for one hour at 1300° C. in an air atmosphere. Reboil was observed at the bottom of the crucible between the platinum and glass composition (A).

When the position of glass compositions (A) and (B) was reversed, such that the high alkali glass was on the surface using the same conditions of temperature and an air atmosphere, no reboil occurred.

To show that the concentration of sodium ion was responsible for the polarity of the cell, a small amount of sodium carbonate was placed on the surface of the low alkali glass in the crucible in which reboil had occurred and the crucible again placed in the furnace. After ten minutes it was observed that the bubbles had been reabsorbed into the glass indicating that the polarity of the concentration cell had been reversed.

The results of these experiments help to explain the finding that the surface of the molten glass is frequently electrically positive with respect to the interior of the glass when the glass is in contact with metallic platinum. It is hypothesized that a concentration cell arises between the surface of the glass and the interior of the glass due to the volatility of various components of the glass which, for example, in alkali containing glasses produces a low alkali content at the surface.

EXAMPLE IV

In order to show that an electron conductor, such as platinum, is required in order for the galvanic cell to be formed, a soda lime glass was placed in a ceramic crucible and heated to a temperature of about 1225° in an air atmosphere and no reboil was observed. A piece of platinum was thereafter placed and submerged on the bottom of the crucible and still no reboil occurred. Thereafter a platinum wire was placed along the side of the crucible to connect the piece of platinum and the atmosphere. Reboil was then observed on the surface of the submerged piece of platinum.

EXAMPLE V

To show that reboil occurs as a result of a temperature gradient in the glass, a borosilicate glass was placed in a platinum boat having the dimensions 6″ long, ¼″ wide, and ¼″ high. The glass was heated in an air atmosphere in a furnace having a temperature gradient between hot and cold portions of about 120° C. Reboil was observed to occur largely confined to the hotter third portion of the boat. The upper temperature was varied between 1300–1400° C. The temperature of the glass composition was determined by platinum-rhodium thermocouples located at each end of the boat. It was noticed that reboil occurred only at the hotter portion of the glass. Platinum wires were immersed in the glass near each end of the boat and the EMF was measured with an electrometer. A voltage was found to exist between the hot end and the cold end of the boat and an EMF of between 40–60 millivolts was recorded. The hot end is negative.

When the boat was removed from the furnace and turned around such that the previously hotter portion now became the colder portion of the boat, the bubbles which had previously formed gradually became reduced in size and eventually disappeared and bubbles appeared at the hot end.

Substituting a boat made of a ceramic material resulted in no reboil formation.

When a platinum boat containing the borosilicate glass was placed in an argon atmosphere instead of an air, a slight amount of bubble formation was observed. This may be explained by the incomplete exclusion of air from the furnace or the presence of gases in the molten glass.

We claim:

1. A method of eliminating the formation of gaseous bubbles in molten glass which previously appeared plain caused by the development of an internally induced galvanic cell while the glass is in contact with a vessel having electron conducting properties comprising covering the cathodic portion of said galvanic cell with an inert nonoxidizing atmosphere.

2. The method according to claim 1, wherein said nonoxidizing atmosphere is a member selected from the group consisting of nitrogen, argon, and carbon dioxide.

3. A method of eliminating the formation of gaseous bubbles in a glass melt which previously appeared plain caused by the development of an internally induced galvanic cell comprising melting a glass composition containing at least a metal oxide selected from the group consisting of alkali metal oxide and alkaline earth metal oxide in a vessel having electron conducting properties in the presence of an inert nonoxidizing atmosphere at the cathodic portion of said galvanic cell.

4. The method according to claim 3, wherein said metal oxide is alkali metal oxide.

5. The method of claim 3, wherein said galvanic cell is thermally induced.

6. The method of claim 3, wherein said galvanic cell arises from a difference in concentration of a constituent in the glass melt.

7. The method of claim 9, wherein the difference in concentration is caused by the more rapid volatilization of alkali metal oxide from one portion of the vessel as compared to another portion.

8. A method of eliminating the formation of gaseous bubbles in a glass melt which previously appeared plain caused by the development of an internally induced galvanic cell in the refiner end of a continuous glass melting tank comprising the steps of:
    (a) flowing the molten glass through said refiner end which has been lined with an electron conductor and
    (b) covering the cathodic portion of said galvanic cell with a nonoxidizing atmosphere.

9. A method of eliminating the formation of gaseous bubbles in a glass melt which previously appeared plain caused by the development of an internal thermally induced galvanic cell in the refiner end of a continuous glass melting tank comprising flowing the molten glass through said refiner end which has been lined with platinum and covering the cathodic portion of said galvanic cell at the platinum-glass-atmosphere interface with argon gas.

10. A method of eliminating reboil in a platinum lined refiner end of a continuous glass melting tank comprising the steps of:
   (a) flowing a molten borosilicate glass through said refiner end wherein there is a thermal gradient between the refiner bottom and the orifice such that the hottest portion is in the vicinity of the finer bottom and the coolest portion is in the vicinity of the orifice and the stir chamber, and
   (b) covering only the coolest portion with an argon atmosphere whereby reboil at the hottest portion is prevented.

References Cited

UNITED STATES PATENTS

| | | | |
|---|---|---|---|
| 2,038,627 | 4/1936 | Badger | 65—135 X |
| 2,781,411 | 2/1957 | Geffcken. | |
| 2,877,280 | 3/1959 | Eden. | |
| 3,109,045 | 10/1963 | Silverman | 65—32 X |
| 3,212,871 | 10/1965 | Vatterodt | 65—32 X |
| 3,233,993 | 2/1966 | Weidel | 65—32 X |
| 3,320,045 | 5/1967 | Weiss et al. | 65—32 X |
| 2,773,111 | 12/1956 | Arbelt et al. | 65—136 X |
| 3,305,340 | 2/1967 | Atkeson | 65—136 |
| 2,773,111 | 12/1956 | Arbeit et al. | 65—136 XR |
| 3,305,340 | 2/1967 | Atkeson | 65—136 |

DONALL H. SYLVESTER, *Primary Examiner.*

S. LEON BASHORE, FRANK W. MIGA, *Examiners.*

UNITED STATES PATENT OFFICE
CERTIFICATE OF CORRECTION

Patent No. 3,387,961            June 11, 1968

Walter M. Buehl et al.

It is certified that error appears in the above identified patent and that said Letters Patent are hereby corrected as shown below:

Column 3, line 26, "election" should read -- electron --; line 48, "absecne" should read -- absence --. Column 4, line 15, "0.2" should read -- 0.3 --; line 24, "strip" should read -- stir --. Column 6, line 61, the claim reference numeral "9" should read -- 6 --.

Signed and sealed this 16th day of December 1969.

(SEAL)
Attest:

Edward M. Fletcher, Jr.            WILLIAM E. SCHUYLER, JR.
Attesting Officer            Commissioner of Patents